United States Patent
Jagota et al.

(10) Patent No.: US 8,193,661 B2
(45) Date of Patent: Jun. 5, 2012

(54) DC PLANT CONTROLLER AND METHOD FOR SELECTING AMONG MULTIPLE POWER SOURCES AND DC PLANT EMPLOYING THE SAME

(75) Inventors: Anurag Jagota, Plano, TX (US); Roy J. Davis, Rowlett, TX (US); Vijayan J. Thottuvelil, Addison, TX (US)

(73) Assignee: Lineage Power Corporation, Plano, TX (US)

( * ) Notice: Subject to any disclaimer, the term of this patent is extended or adjusted under 35 U.S.C. 154(b) by 339 days.

(21) Appl. No.: 12/372,659

(22) Filed: Feb. 17, 2009

(65) Prior Publication Data
US 2010/0207454 A1    Aug. 19, 2010

(51) Int. Cl.
*H02J 9/00* (2006.01)
(52) U.S. Cl. .......................................... 307/65
(58) Field of Classification Search ............... 307/43, 307/65
See application file for complete search history.

(56) References Cited

U.S. PATENT DOCUMENTS

| | | | |
|---|---|---|---|
| 5,740,023 A | 4/1998 | Brooke et al. | |
| 6,670,721 B2 | 12/2003 | Lof et al. | |
| 7,274,975 B2 | 9/2007 | Miller | |
| 7,615,875 B1 | 11/2009 | Henneberg et al. | |
| 2005/0116546 A1* | 6/2005 | Zeighami et al. | 307/51 |
| 2008/0217998 A1 | 9/2008 | Parmley | |
| 2009/0076661 A1* | 3/2009 | Pearson et al. | 700/291 |

OTHER PUBLICATIONS

Fuzzy Control for Parallel Operation of Power Multi-Sources; Adriano S. Carvalho, et al.; European Space Agency—Provided by the NASA Astrophysics Data System; 8 pages.

* cited by examiner

*Primary Examiner* — Michael Rutland Wallis

(57) ABSTRACT

Various embodiments of a DC plant controller, methods of selecting among multiple power sources and DC plants incorporating the DC plant controller or the method. In one embodiment, the DC plant controller includes: (1) a source identifier configured to identify power sources couplable to a common DC bus, (2) a source prioritizer coupled to the source identifier and configured to prioritize the power sources based on at least one criterion and (3) an output characteristic assigner coupled to the source prioritizer and configured to assign output characteristics to the power sources that differ from one another as a function of the priority.

16 Claims, 2 Drawing Sheets

DC PLANT CONTROLLER AND METHOD FOR SELECTING AMONG MULTIPLE POWER SOURCES AND DC PLANT EMPLOYING THE SAME

TECHNICAL FIELD

This application is directed, in general, to plant controllers and, more specifically, to a DC plant controller, a method for selecting among multiple power sources and a DC plant employing the controller or the method.

BACKGROUND

Conventionally, a telecommunication or other DC-based power plant employs multiple AC or DC power sources to provide a regulated DC voltage to a load. AC power sources use rectifiers to convert their AC output voltages to a regulated DC output, and DC power sources use DC-DC converters to adjust their voltages to a regulated DC output. A DC bus aggregates the DC outputs, allowing them to power the load. A central controller controls the rectifiers and converters to allocate the load among the multiple power sources. Sometimes a single power source bears the load, but more often multiple power sources share the load to some extent. Various techniques have been devised to achieve load sharing among multiple power sources. U.S. Pat. No. 5,740,023, which issued to Brooks, et al., on Apr. 14, 1998, entitled "Control System for a Modular Power Supply and Method of Operation Thereof" and commonly assigned with this application describes several conventional load-sharing technique and introduces a novel technique particularly suited for use with modular power supplies of nominally the same type and rating.

SUMMARY

One aspect provides a DC plant controller. In one embodiment, the DC plant controller includes: (1) a source identifier configured to identify power sources couplable to a common DC bus, (2) a source prioritizer coupled to the source identifier and configured to prioritize the power sources based on at least one criterion and (3) an output characteristic assigner coupled to the source prioritizer and configured to assign output characteristics to the power sources that differ from one another as a function of the priority.

Another aspect provides a method of selecting among multiple power sources couplable to a common DC bus. In one embodiment, the method includes: (1) identifying the power sources, (2) prioritizing the power sources based on at least one criterion and (3) assigning output characteristics to the power sources that differ from one another as a function of the priority.

Yet another aspect provides a DC plant. In one embodiment, the DC plant includes: (1) power sources couplable to a common DC bus and selected from the group consisting of: (1a) an engine-driven generator, (1b) a windmill-driven generator, (1c) a solar array and (1d) AC mains; (2) rectifiers and DC-DC converters associated with the power sources and (3) a DC plant controller, including: (3a) a source identifier configured to identify the power sources, (3b) a source prioritizer coupled to the source identifier and configured to prioritize the power sources based on at least one criterion and (3c) an output characteristic assigner coupled to the source prioritizer and configured to assign output characteristics to the power sources that differ from one another as a function of the priority and assign power limits to ones of the rectifiers and the DC-DC converters.

BRIEF DESCRIPTION Reference is now made to the following descriptions taken in conjunction with the accompanying drawings, in which.

DETAILED DESCRIPTION

As stated above, various conventional techniques have been devised to achieve load sharing among multiple power sources. However, conventional plants tend to use power sources that are predominantly of the same general type to provide primary DC power. For example, most plants use parallel rectifiers to provide primary DC power. They may differ in terms of their rated capacity but otherwise function identically. However, with the increasing interest and usage of alternative power sources, it is becoming necessary to provide a mechanism for a telecommunication or other DC-based power system to be able to accommodate multiple power sources that differ, perhaps fundamentally, in type, to provide primary DC power. More often than not one power source is unable to provide the full power a load requires. Thus, multiple power sources may need to be used concurrently to provide stable operation. What is needed is a system or a method for selecting the proper power sources from the power sources that are available at a given point in time to provide primary DC power.

With the benefit of the teachings herein, DC plants may benefit from a variety of different types of power sources in terms of overall operating efficiency, reliability or environmental desirability. DC plants may also be located in relatively remote areas, where connection to the commercial power grid is problematic. DC plants may also take advantage of emerging (e.g., relatively "green") power sources, which may operate more sporadically than more conventional power sources. Thus DC plants may be associated with geographically dispersed facilities of all kinds, including central offices (COs), cellular base stations, Digital Subscriber Line (DSL), fiber optical, radio and microwave repeaters, routers, gateways and Customer Premises Equipment (CPE).

Figure 1:
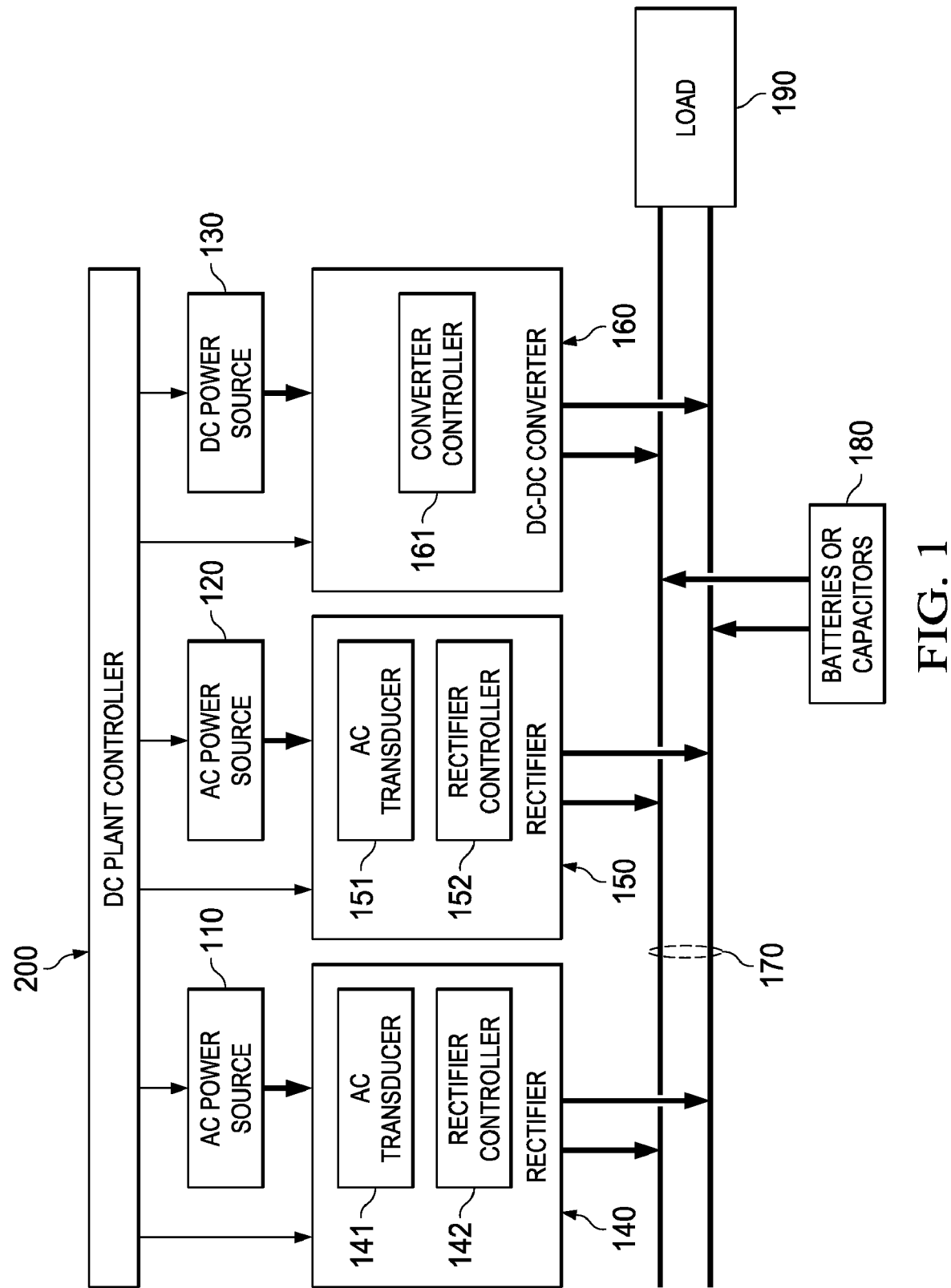
FIG. 1 is a block diagram of one embodiment of a plant employing a DC plant controller or a method constructed or carried out according to the principles of the invention.

FIG. 1 is a block diagram of one embodiment of a plant employing a plant controller or a method constructed or carried out according to the principles of the invention. The plant includes one or more AC power sources and one or more DC power sources and corresponding equipment to provide suitable primary DC power. In the specific embodiment of FIG. 1, the plant includes a first AC power source 110, a second AC power source 120 and a first DC power source 130. The first AC power source 110 provides its AC output to a first rectifier 140 that includes a first AC transducer 141 and a first rectifier controller 142 and provides a regulated DC output. The second AC power source 120 provides its AC output to a second rectifier 150 that includes a second AC transducer 151 and a second rectifier controller 152 and provides a regulated DC output. The first DC power source 160 provides its DC output to a first DC-DC converter 160 that includes a converter controller 161 and provides a regulated DC output. The first AC power source 110, the second AC power source 120 and first DC power source 130, acting through their respective first rectifier 140, second rectifier 150 and first DC-DC converter 160 are coupled to positive and negative rails of a common DC bus 170 and selectably provide primary DC power to the DC bus 170. One or more batteries or capacitors 180 are also coupled to the DC bus 170 to provide secondary DC power to the extent that the first rectifier 140, the second rectifier 150 and the first DC-DC converter 160 are unable to provide sufficient primary DC power. In one embodiment, the one or more batteries or capacitors 180 include one or more battery strings. In another embodiment, the one or more batteries or capacitors 180 include one or more large, "super" capacitors. A load 190 is coupled to the DC bus 170 and consumes the DC power provided by one or more of the first rectifier 140, the second rectifier 150, the first DC-DC converter 160 and the one or more batteries or capacitors 180. The load may be telecommunication equipment, computer equipment, equipment of any kind whatsoever (including recharging equipment for the one or more batteries or capacitors 180) or any other kind of conventional or later-developed load.

In one embodiment, the first rectifier 140, the second rectifier 150 and the first DC-DC converter 160 are rack-mountable and occupy one or more shelves of a standard rectifier/converter rack. In another embodiment, the first rectifier 140, the second rectifier 150 and the first DC-DC converter 160 are joined together with other rectifiers and converters (not shown) to form bays of rectifiers and converters. The latter embodiment is more typically associated with a very large DC plant.

A DC plant controller 200 is coupled to the first rectifier 140, the second rectifier 150 and the DC-DC converter 160 to monitor, control or both monitor and control the same. In the illustrated embodiment, the DC plant controller 200 is also coupled to the first AC power source 110, the second AC power source and the first DC power source 130 to monitor, control or both monitor and control the same. One or more data links may be employed to allow this monitoring or control. A first unreferenced data link couples the power sources, namely the first AC power source 110, the second AC power source 120 and the first DC power source 130, to the DC plant controller 200. In one embodiment, the first data link is a serial data link. In another embodiment, the first data link is a bidirectional link. The first data link or another, second unreferenced data link also couples the first rectifier 140, the second rectifier 150 and the first DC-DC converter 160 to the DC plant controller 200. In one embodiment, the data link is a serial data link. In another embodiment, the data link is a bidirectional link.

In general, the DC plant controller 200 is configured to assign output characteristics to the various power sources based on a priority. The output characteristics differ from one another. For example, the power source assigned the highest output voltage provides power to the load 190 until (1) it enters a current-limiting mode of operation in which its output voltage begins to drop in order to limit output current or (2) its output voltage begins to drop naturally. When its output voltage reaches that assigned to the power source having the second highest priority, the two power sources begin to share the load 190. If the load 190 remains or becomes so large that both power sources operate in current-limiting mode, a power source having a third highest priority begins to share, and so on. The DC plant controller 190 may incrementally raise the output voltage of some of the power sources to maintain the voltage of the DC bus 170 close to the output voltage originally assigned to the power source having the highest priority to ensure that maximum utilization power from that power source is achieved. Should the load 190 decrease, power sources exit the current sharing mode and contribute less to load-sharing in reverse priority order.

For example if the bus 170 needs to be at 54V to keep the one or more batteries or capacitors 180 charged, and a solar array has the highest priority, its output voltage will be assigned to be 54 volts. The next priority power source is assigned an incrementally lower output voltage, and so forth. If the solar array is unable to bear the load 190, its output voltage will drop down to the voltage level of the next power source. The DC plant controller 200 can then incrementally raise the output voltage to be as close as possible to the required 54 volts, while maintaining the solar array power source in a current limit mode to ensure that maximum utilization of solar energy is achieved.

Figure 2:
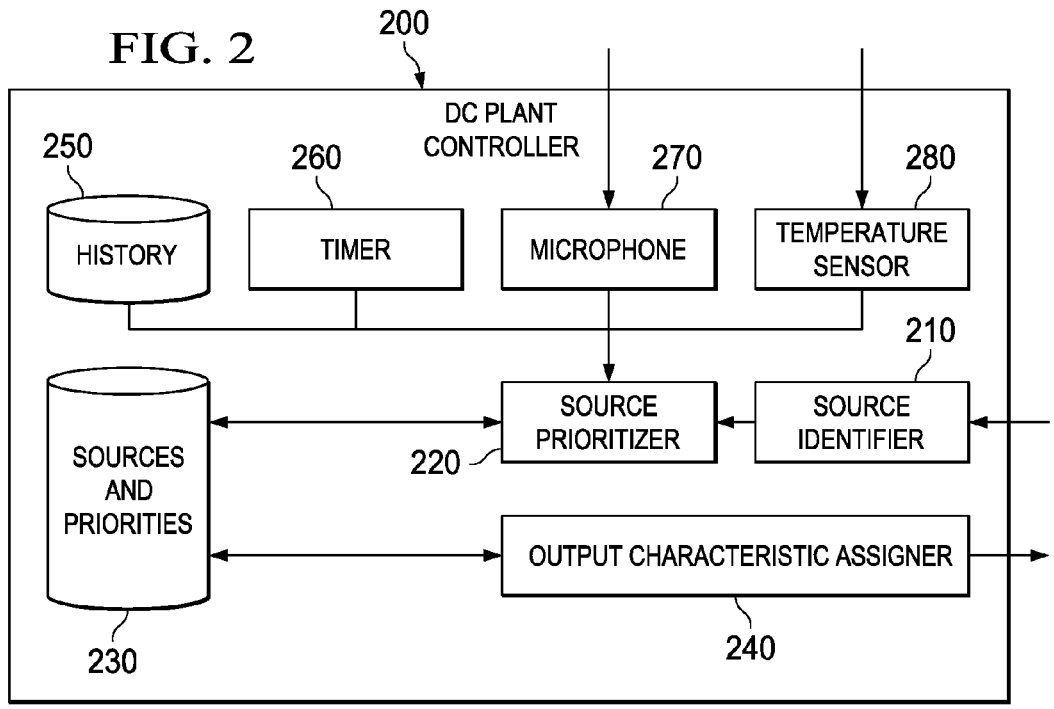
FIG. 2 is a block diagram of one embodiment of a DC plant controller constructed according to the principles of the invention.

One embodiment of the DC plant controller 200 constructed according to the principles of the invention will now be described in conjunction with FIG. 2. The DC plant controller 200 includes a source identifier 210. The illustrated embodiment of the source identifier 210 is configured to identify power sources (e.g., the first AC power source 110, the second AC power source and the first DC power source 130 of FIG. 1) couplable to a common DC bus (e.g., the DC bus 170 of FIG. 1). For example, if the first AC power source 110 or the second AC power source 120 is an engine-driven generator, a windmill-driven generator, a water-driven generator, a geothermally driven generator or AC mains (i.e., leading from a commercial power grid), the source identifier 210 identifies it as such. As another example, if the first DC power source 130 is a solar array or a battery, the source identifier 210 identifies it as such. In one embodiment, the source identifier 210 is configured to receive data indicating the identity of a power source from a memory associated with the power source or a database separate from the power source. In another embodiment, the source identifier 210 is configured to identify the power source based on the characteristics of the power it produces. For example, the power produced by a windmill-driven generator varies in frequency and voltage as a function of windmill speed, while the power produced by a solar array varies in amperage roughly as a function of the time of day. The power produced by other power sources may likewise have characteristics that allow a properly configured source identifier to identify them.

Identifying the power sources provides a basis for prioritizing them. Accordingly, the DC plant controller 200 also includes a source prioritizer 220. The illustrated embodiment of the source prioritizer 220 is coupled to the source identifier 210 and is configured to prioritize the power sources based on at least one criterion.

In one embodiment, the criterion is operational cost, namely the cost to operate each of the identified power sources (e.g., taking into account fuel or electricity costs). In a more specific embodiment, the source prioritizer 220 gives a power source having a lower operational cost a higher priority than a power source having a higher operational cost.

In another embodiment, the criterion is a "carbon footprint," which is a metric used nowadays to gauge the environmental impact of operating each of the identified power sources. In a more specific embodiment, the source prioritizer 220 gives a power source having a smaller carbon footprint a higher priority than a power source having a larger carbon footprint.

In yet another embodiment, the criterion is noise generation, namely the noise generated operating of each of the identified power sources. In a more specific embodiment, the source prioritizer 220 gives a power source that generates less noise a higher priority than a power source that generates more noise.

In still another embodiment, the criterion is a combination of power sources selected. For example, if a windmill-driven generator is given a highest priority, a highly reliable power source, such as AC mains, may be given the next highest priority given the unpredictable nature of windmill operation. If a solar array is given a highest priority, an engine-driven generator may be given the next highest priority given the predictable decline in solar array output that occurs at dusk.

In yet still another embodiment, the criterion is an environmental factor, such as time of day, time of year, sunlight level or temperature. For example, a windmill-driven generator may be given a far higher priority during the day, when winds are typically higher, than at night, when winds tend to be calmer. A solar array may be given a higher priority during the summer than during the winter. An engine-driven generator may be given a higher priority during the day than at night, when neighbors are asleep, but perhaps not as high during a relatively hot day, when its operating temperature may become excessive. Those skilled in the pertinent art will readily see a vast array of possible criteria upon which priority may be based, including any combination of the above or other criteria.

The DC plant controller 200 further includes a sources and priorities database 230. The sources and priorities database 230 is coupled to the source prioritizer 220. In one embodiment, the sources and priorities database 230 is configured to store data pertaining to the identity of the power sources in the DC plant that the source identifier 210 may employ to identify the power sources. In another embodiment, the sources and priorities database 230 is configured to store data pertaining to one or more criteria that the source prioritizer 220 may employ to prioritize the power sources.

The DC plant controller 200 further includes an output characteristic assigner 240. The illustrated embodiment of the output characteristic assigner 240 is coupled to the source prioritizer 230 and is configured to assign one or more output characteristics to the power sources that differ from one another as a function of the priority. In one embodiment, the output characteristics may include output voltages, power limits or current limits or current share thresholds. In a more specific embodiment, the output characteristics consist of output voltage. In an alternative, more specific embodiment, the output characteristics consist of current share/current limit/power limit thresholds (i.e., setpoints). In another embodiment, the sources and priorities database 230 is configured to make the data pertaining to one or more criteria that the source prioritizer 220 may employ to prioritize the power sources available to the output characteristic assigner 240 to effect assignment of the output characteristics.

In one embodiment, the output voltages differ by less than one volt and decrease as the priority decreases. For example, the output voltage of the power source given the highest priority may be assigned to be −24.0 volts. The output voltage of the power source given the second highest priority may be assigned to be −23.7 volts. The output voltage of the power source given the third highest priority may be assigned to be −23.5 volts.

In another embodiment, the output voltages differ by less than about five volts and decrease as the priority decreases. For example, the output voltage of the power source given the highest priority may be assigned to be +54 volts. The output voltage of the power source given the second highest priority may be assigned to be +53 volts. The output voltage of the power source given the third highest priority may be assigned to be +51 volts.

In yet another embodiment, the output voltages differ by less than about ten volts and decrease substantially linearly as the priority decreases. For example, the output voltage of the power source given the highest priority may be assigned to be −48 volts. The output voltage of the power source given the second highest priority may be assigned to be −46 volts. The output voltage of the power source given the third highest priority may be assigned to be −44 volts.

In the context of FIG. 1, the output characteristic assigner 240 is configured to assign power limits to the first AC power source 110, the second AC power source and the first DC power source 130 by assigning power limits to their corresponding first rectifier 140, second rectifier 150 and first DC-DC converter 160. In one embodiment, the source identifier 210 is configured to communicate with the power sources via the first data link of FIG. 1, and the output characteristic assigner 240 is configured to communicate with the power sources via the second data link of FIG. 1. In certain embodiments, the output characteristic assigner 240 is further configured to calculate the holdup time of the one or more batteries or capacitors 180 of FIG. 1 and place ones of the power sources on standby based on the calculated holdup time.

As stated above, one or more criteria may be employed to prioritize among the power sources. Accordingly, the DC plant controller 200 may include a timer 260 configured to provide information regarding, e.g., time of day or time of year, which may be useful if time is a criterion. The DC plant controller 200 may include a microphone 270 configured to provide a signal indicating noise, which may be useful if noise is a criterion. The DC plant controller 200 may include a temperature sensor 280 configured to provide a signal indicating a temperature, which may be useful if operating or ambient temperature is a criterion. The DC plant controller 200 may include a history database 250 configured to store data regarding the past operation of the DC plant. In one embodiment, the source prioritizer 220 is configured to factor historical data into future prioritization decisions. For example, if a particular DC plant is located in a particularly cloudy area, its solar array may prove less effective over time and therefore merit being assigned a lower priority.

Figure 3:
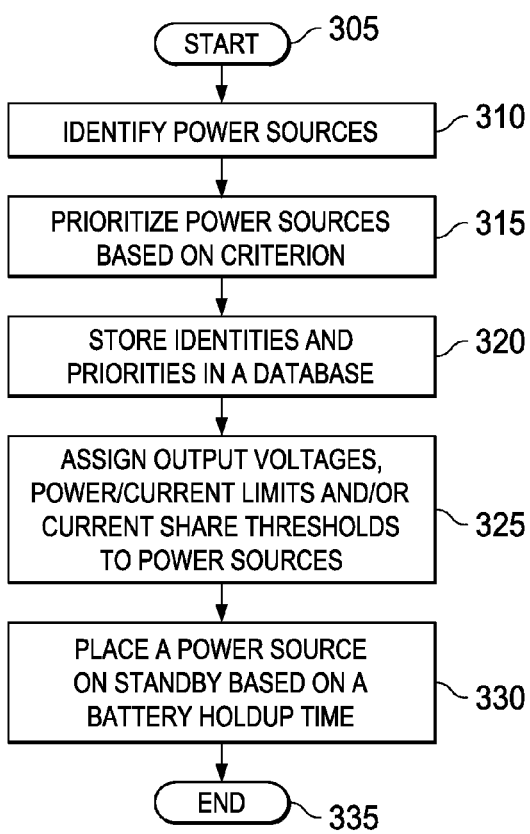
FIG. 3 is a flow diagram of one embodiment of a method of selecting among multiple power sources and controlling a plant carried out according to the principles of the invention.

FIG. 3 is a flow diagram of one embodiment of a method of selecting among multiple power sources and controlling a plant carried out according to the principles of the invention. In various embodiments, the power sources may include one or more of: an engine-driven generator, a windmill-driven generator, a solar array and AC mains.

The method begins in a start step 305. In a step 310, the power sources are identified. The identifying may be carried out as described above. In a step 315, the power sources are prioritized based on at least one criterion. In various embodiments, the at least one criterion may include one or more of: operational cost, carbon footprint, noise generation, a combination of power sources selected and an environmental factor.

In the embodiment of FIG. 3, the identities and priorities are stored for later use. Accordingly, in a step 320, the identities and priorities are stored in a database. In analog systems, the identities and priorities may be implemented using switches, jumpers or other hardware elements. Also in the embodiment of FIG. 3, rectifiers, DC-DC converters or a combination thereof are associated with the power sources.

In a step 325, output voltage, power limit/current limit and/or current share are assigned to the individual rectifiers and/or converters based on priority of their powering source. In one embodiment, the sequence is output voltage followed by power/current limit followed by current share threshold. Other sequences are employed in alternative embodiments.

The output voltage may differ from one another as a function of the priority. In one embodiment, the output voltages differ by less than one-tenth of a volt and decrease as the priority decreases. In another embodiment, the output voltages differ by less than one volt and decrease as the priority decreases. In yet another embodiment, the output voltages differ by less than about ten volts and decrease substantially linearly as the priority decreases. When used with batteries or other energy storage devices or when used with voltage sensitive loads, the output voltage assigned to the rectifiers and/or converters may be identical.

The power/current limit values assigned to rectifiers or converters may differ from one another as a function of the priority of their powering source. In one embodiment, the power/current limit values for the highest priority source is set to 100% and then decremented by fixed or varying amounts as the priority decreases. In another embodiment, the power/current limit values for the highest priority source is set below 100% and then decremented by fixed or varying amounts as the priority decreases. In yet another embodiment, the power/current limit values are identical for all the power sources.

The current share values assigned to rectifiers or converters may differ from one another as a function of the priority of their powering source. Current sharing can be implemented through an analog bus where each unit compares its output to a reference signal based on the outputs of other units; or through a digital scheme where the DC plant controller measures/calculates the overall output of the plant and assigns adjustments to rectifier voltage and/or current limit values through a digital bus. In one embodiment with the analog current share bus, the rectifiers or converters with the lowest priority are inhibited from adjusting their settings for a large or indefinite increment of time. The rectifier/converters with the highest priority are allowed to respond to the current share reference bus instantaneously and have a higher current/power limit setting. In another embodiment, using a digital bus for current share, the controller adjusts the outputs of the rectifiers such that the high priority rectifiers or converters are loaded the most and the low priority units are lightly loaded. Depending on the digital scheme employed for current sharing, one such way is through the adjustment of the outer voltage loop in magnitudes of less than 0.01V. Larger voltages may be covered by the output voltage setting.

In a step 330 one or more of the power sources or rectifiers or converters associated with the power source are placed on standby based on a calculated battery holdup time. The steps 310-330 may be repeated in whole or in part occasionally or periodically as desired based on the needs of a particular DC plant. The method ends in a step 335.

Those skilled in the art to which this application relates will appreciate that other and further additions, deletions, substitutions and modifications may be made to the described embodiments.

What is claimed is:

1. A DC plant controller, comprising:
   a source identifier configured to identify power sources couplable to a common DC bus;
   a history database configured to store history data regarding the past operation of a DC plant controlled by said DC plant controller;
   a source prioritizer coupled to said source identifier and said history database and configured to prioritize said power sources based on at least one criterion and said history data; and
   an output characteristic assigner coupled to said source prioritizer and configured to assign output characteristics to said power sources that differ from one another as a function of said priority, and to place ones of said power sources on standby based on a calculated battery holdup time.

2. The DC plant controller as recited in claim 1 wherein said output characteristics differ by less than one volt and decrease as said priority decreases.

3. The DC plant controller as recited in claim 1 wherein said output characteristics differ by less than about five volts and decrease as said priority decreases.

4. The DC plant controller as recited in claim 1 wherein said output characteristics differ by less than about ten volts and decrease substantially linearly as said priority decreases.

5. The DC plant controller as recited in claim 1 wherein said power sources are selected from the group consisting of:
   an engine-driven generator,
   a windmill-driven generator,
   a solar array, and
   AC mains.

6. The DC plant controller as recited in claim 1 wherein said at least one criterion is selected from the group consisting of:
   operational cost,
   carbon footprint,
   noise generation,
   types of said power sources, and
   an environmental factor.

7. The DC plant controller as recited in claim 1 wherein rectifiers and DC-DC converters are associated with said power sources and said output characteristic assigner is further configured to assign power limits to one or more of said rectifiers and said DC-DC converters.

8. The DC plant controller as recited in claim 7 wherein said source identifier is configured to communicate with said power sources via a first bidirectional link and said output characteristic assigner is configured to communicate with said power sources via a second bidirectional link.

9. A method of selecting among multiple power sources couplable to a common DC bus, comprising:
   identifying said power sources;
   storing history data regarding past operation of said power sources;
   prioritizing said power sources based on at least one criterion and said history data;
   assigning output characteristics to said power sources that differ from one another as a function of said priority, and
   placing ones of said power sources on standby based on a calculated battery holdup time.

10. The method as recited in claim 9 wherein said output characteristics differ by less than one volt and decrease as said priority decreases.

11. The method as recited in claim 9 wherein said output characteristics differ by less than about five volts and decrease as said priority decreases.

12. The method as recited in claim 9 wherein said output characteristics differ by less than about ten volts and decrease substantially linearly as said priority decreases.

13. The method as recited in claim 9 wherein said power sources are selected from the group consisting of:
   an engine-driven generator,
   a windmill-driven generator, a solar array, and
AC mains.

14. The method as recited in claim 9 wherein said at least one criterion is selected from the group consisting of:
operational cost,
carbon footprint,
noise generation,
types of said power sources, and
an environmental factor.

15. The method as recited in claim 9 wherein rectifiers and DC-DC converters are associated with said power sources and said method further comprises assigning power limits to ones of said rectifiers and said DC-DC converters.

16. The method as recited in claim 15 further comprising communicating identities from said power sources to said source identifier via a first bidirectional link and communicating output characteristic and power limit commands from said output characteristic assigner to said power sources, said rectifiers and said DC-DC converters via a second bidirectional link.

* * * * *